(12) United States Patent
Kim

(10) Patent No.: US 6,453,690 B1
(45) Date of Patent: Sep. 24, 2002

(54) METHOD FOR CONTROLLING LINEAR EXPANSION VALVE IN AIR CONDITIONER WITH TWO COMPRESSOR

(75) Inventor: Cheol Min Kim, Kyonggi-do (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/985,888

(22) Filed: Nov. 6, 2001

(30) Foreign Application Priority Data

Nov. 10, 2000 (KR) .......................... 2000-66778

(51) Int. Cl.[7] .............................. F25B 7/00; F25B 41/04
(52) U.S. Cl. ................................... 62/222; 62/175
(58) Field of Search ......................... 62/222, 175, 225, 62/196.2, 210, 204

(56) References Cited

U.S. PATENT DOCUMENTS 5,187,944 A * 2/1993 Jarosch .................... 62/225
5,263,333 A * 11/1993 Kubo et al. ............... 62/160

\* cited by examiner

Primary Examiner—Denise L. Esquivel
Assistant Examiner—Marc Norman
(74) Attorney, Agent, or Firm—Birch, Stewart, Kolasch & Birch, LLP

(57) ABSTRACT

Method for controlling a linear expansion valve in an air conditioner with two compressors, which can prevent breakage of the compressor, and starting failure caused by liquidus refrigerant introduced into the compressor at an initial starting, and preventing drop of cooling performance caused by reduced refrigerant flow coming from a low suction pressure of the compressor at an initial unsteady state.

3 Claims, 4 Drawing Sheets

METHOD FOR CONTROLLING LINEAR EXPANSION VALVE IN AIR CONDITIONER WITH TWO COMPRESSOR

BACKGROUND OF THE INVENTION

1. Field of the Invention

The present invention relates to a method for controlling a linear expansion valve in an air conditioner with two compressors, and more particularly, to a method for controlling a linear expansion valve in an air conditioner with two compressors, in which two compressors with different compression capacities are provided for varying compression of refrigerant according to cooling/heating load.

2. Background of the Related Art

In general, the air conditioner cools/heats a room by using refrigerant compressed to a high temperature, and a high pressure at the compressor. The air conditioner with two compressors each operative selectively according to a cooling/heating load is provided for reducing a power required for driving the compressors, has the following system.

Referring to FIG. 1, a related art air conditioner with two compressors is provided with a large capacity compressor 2, and a small capacity compressor 4 selectively operative during cooling a room for varying compression of refrigerant, an outdoor heat exchanger 6 for heat exchange of the refrigerant compressed at the compressors 2, and 4, a linear expansion valve 8 for expanding the refrigerant condensed at the outdoor heat exchanger 6, an indoor heat exchanger 10 for heat exchange of the refrigerant expanded at the linear expansion valve 8 with room air, and an oil separator 12.

The small compressor 2, and the large compressor 4 may be made to make independent, or interlocked operation depending on a room cooling load condition. Under a condition the two compressors are required to operate simultaneously, the high temperature, and high pressure refrigerant from the small compressor 2, and the large compressor 4 passes through the oil separator 12 for separating oil in the refrigerant. The refrigerant separated from the oil is provided to the outdoor heat exchanger 6, condensed into a high pressure liquid refrigerant, and converted into low temperature, and low pressure refrigerant. Then, the low temperature, and low pressure refrigerant is evaporated into gaseous refrigerant as the low temperature, and low pressure refrigerant passes through the indoor heat exchanger 10, passed through two capillary tubes 14, and 16, and drawn to the compressors 2, and 4 again via a first accumulator 18, and a second accumulator 20, respectively.

If the small compressor 2, and the large compressor 4 are used as heat pumps for room heating, the refrigerant is provided to the indoor heat exchanger 10 via the oil separator 12, and a four way valve (not shown), to condense the refrigerant, passed through the linear expansion valve 8 to convert the refrigerant into low temperature, and low pressure refrigerant, passed through the outdoor heat exchanger 6, to evaporate the refrigerant, and drawn into the compressors 10, and 20 again via the accumulators 18, and 20 again.

The oil discharged from the two compressors 2, and 4, and separated from the refrigerant at the oil separator 12 is involved in pressure drop as the oil passes through the first capillary tube 14, and the second capillary tube 16, and drawn into the compressors, thereby being recovered by the compressors 2, and 4.

As explained, since respective capacities of the compressors 2, and 4 in the air conditioner with two compressors 2, and 4 can be varied with a room load condition, as an expansion valve for regulating a flow of the refrigerant in the air conditioner, the linear expansion valve (LEV) 8 is used. The control of the LEV 8 is divided into a starting control at starting of the compressor, and a control after the starting control of the compressor is finished, wherein, as shown in the drawing, the control after finish of starting employs a control method in which a temperature difference between a temperature sensor 22 at a compressor inlet, and a temperature sensor 24 at a room pipeline is kept constant. The LEV is controlled at the compressor starting, for preventing breakage of the compressor caused by liquidus refrigerant introduced into the compressor at an initial starting, and starting failure, and preventing drop of cooling performance caused by reduced refrigerant flow coming from a low suction pressure of the compressor at an initial unsteady state.

FIG. 2 illustrates a graph of a related art LEV control method.

Referring to FIG. 2, a pulse value to the LEV is set to a value which minimizes the liquidus refrigerant introduction into the compressor at starting of the compressor, and gradually increased to a target value as an operation time period is increased. A time period 't1' for reaching to the target value is divided by 'n' equally, and the pulse value is increased at fixed time intervals, wherein an increment of the pulse value is obtained by dividing a difference of the initial pulse value, and a target pulse value by 'n', equally. Once the pulse value reaches to the target value at a time the target value is expected to reach, the pulse value to the LEV is regulated for controlling a degree of superheat from a time for controlling the degree of superheat.

As shown in a dashed line on a graph shown in FIG. 3, the related art LEV control has a problem of a poor initial cooling performance at starting of the compressor caused by drop of a compressor suction pressure, and a long unsteady state time period until a proper suction pressure is reached.

SUMMARY OF THE INVENTION

Accordingly, the present invention is directed to a method for controlling a linear expansion valve in an air conditioner with two compressors that substantially obviates one or more of the problems due to limitations and disadvantages of the related art.

An object of the present invention is to provide a method for controlling a linear expansion valve in an air conditioner with two compressors, which can prevent breakage of the compressor, and starting failure caused by liquidus refrigerant introduced into the compressor at an initial starting, and preventing drop of cooling performance caused by reduced refrigerant flow coming from a low suction pressure of the compressor at an initial unsteady state.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for controlling a linear expansion valve in an air conditioning system with two compressors of a large compressor and a small compressor, includes the steps of (a) changing an LEV pulse value from an initial value to P1, when a compressor operation time period reaches to Ts-a after the compressors are put into operation, (b) changing the LEV pulse value from P1 to P2, when the compressor operation time period reaches to Tm-b, (c) changing the LEV pulse value from P2 to a target value, when the compressor operation time period reaches to T1-c, and (d) starting a superheat control, after the operation time period of the compressors reaches to T2, where P1 denotes an initial pulse value+a capacity ratio (%) of the small compressor x the target value/100, P2 denotes an initial pulse value+a capacity ratio (%) of the large compressor x the target value/100, T1 denotes a time period to reach to the target value, T2 denotes a time starting to control superheat, Ts denotes a capacity ratio (%) of the small compressor x T1/100, Tm denotes a capacity ratio (%) of the large compressor x T1/100, 'a' denotes a time period the LEV pulse is changed from the initial value to P1, 'b' denotes a time period the LEV pulse is changed from P1 to P2, and 'c' denotes a time period the LEV pulse is changed from P2 to the target value.

When the LEV pulse value is changed from the initial value to P1, the capacity ratio of the large compressor is used, and when the LEV pulse value is changed from P1 to P2, the capacity ratio of the small compressor is used.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 4:
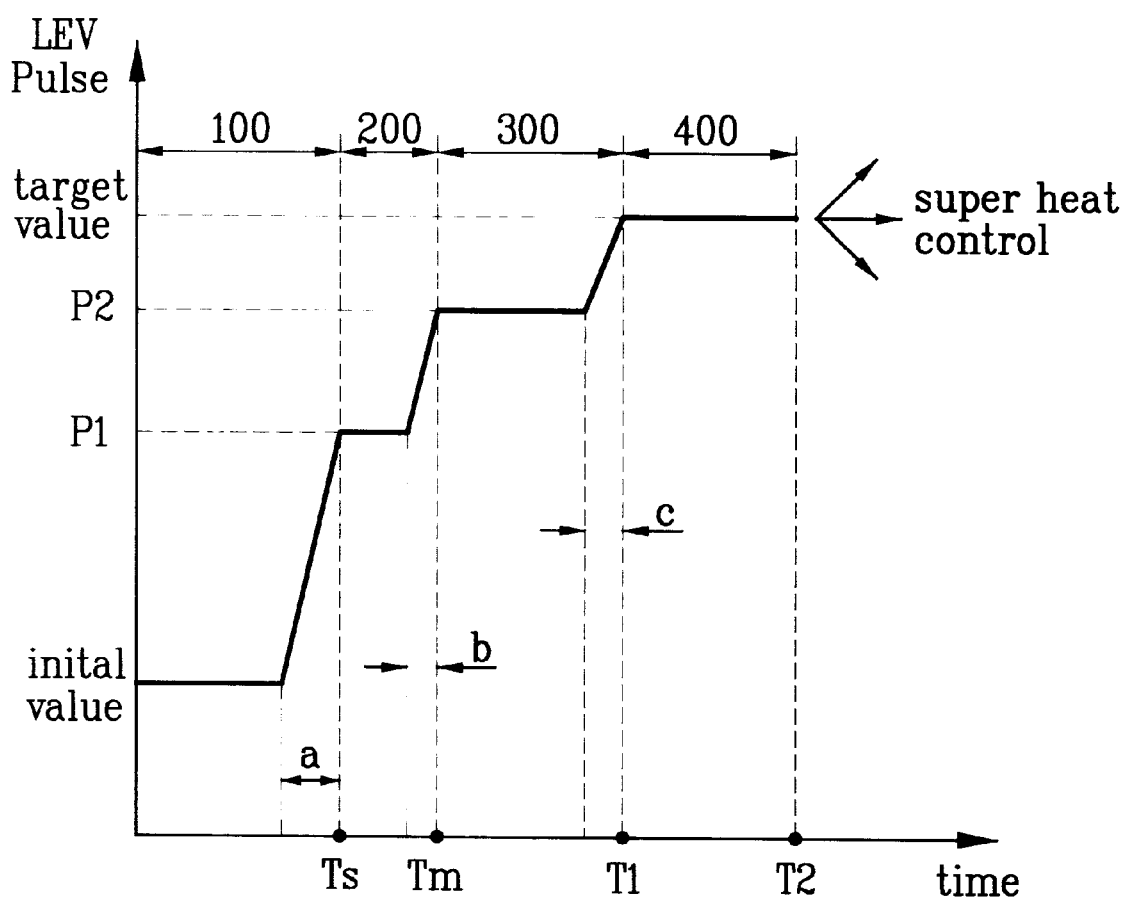

Reference will now be made in detail to the preferred embodiments of the present invention, examples of which are illustrated in the accompanying drawings. FIG. 4 illustrates a graph showing an LEV 8 opening pulse value vs. compressor starting time period in an LEV 8 controlling method for an air conditioner with two compressors 2, and 4 in accordance with a preferred embodiment of the present invention. In a case of an air conditioner system with two compressors 2, and 4, the initial pulse value of the LEV 8 in an initial starting of the compressors 2, and 4 is selected such that the introduction of liquid refrigerant into the compressors 2, and 4 is minimized, and a target value of the LEV pulse to be reached at completion of the initial starting control of the system, and a time period required for reaching to the target value are fixed according to designed.

Referring to FIG. 4, in a first step 100 when a compressor operation time period reaches to Ts-a after the compressors are put into operation, the pulse value of the LEV is changed from the initial value to P1, where Ts denotes a value obtained by multiplying a capacity ratio of the small compressor to a total capacity to a time period T1 required for reaching to the target value, and 'a' denotes a time period the pulse of the LEV is changed from the initial value to the P1. P1 is a value obtained by multiplying the capacity ratio of the small compressor to a total capacity to the target value of the LEV, and adding the initial value thereto.

In a second step 200 when the compressor operation time period reaches to Tm-b, the pulse value of the LEV is changed from P1 to P2, where Tm denotes a value obtained by multiplying a capacity ratio of the large compressor to a total capacity to a time period T1 required for reaching to the target value, and 'b' denotes a time period the pulse of the LEV is changed from the P1 to P2. P2 is a value obtained by multiplying the capacity ratio of the large compressor to a total capacity to the target value of the LEV, and adding the initial value thereto.

In a third step 300 when the compressor operation time period reaches to T1-c, the pulse value of the LEV is changed from P2 to the target value, where 'c' denotes a time period the pulse of the LEV is changed from P2 to the target value.

In a fourth step 400, when a preset time period is passed after the pulse value of the LEV reaches to the target value, the starting control is ended, and a superheat control is started, to control the pulse of the LEV.

Figure 1:
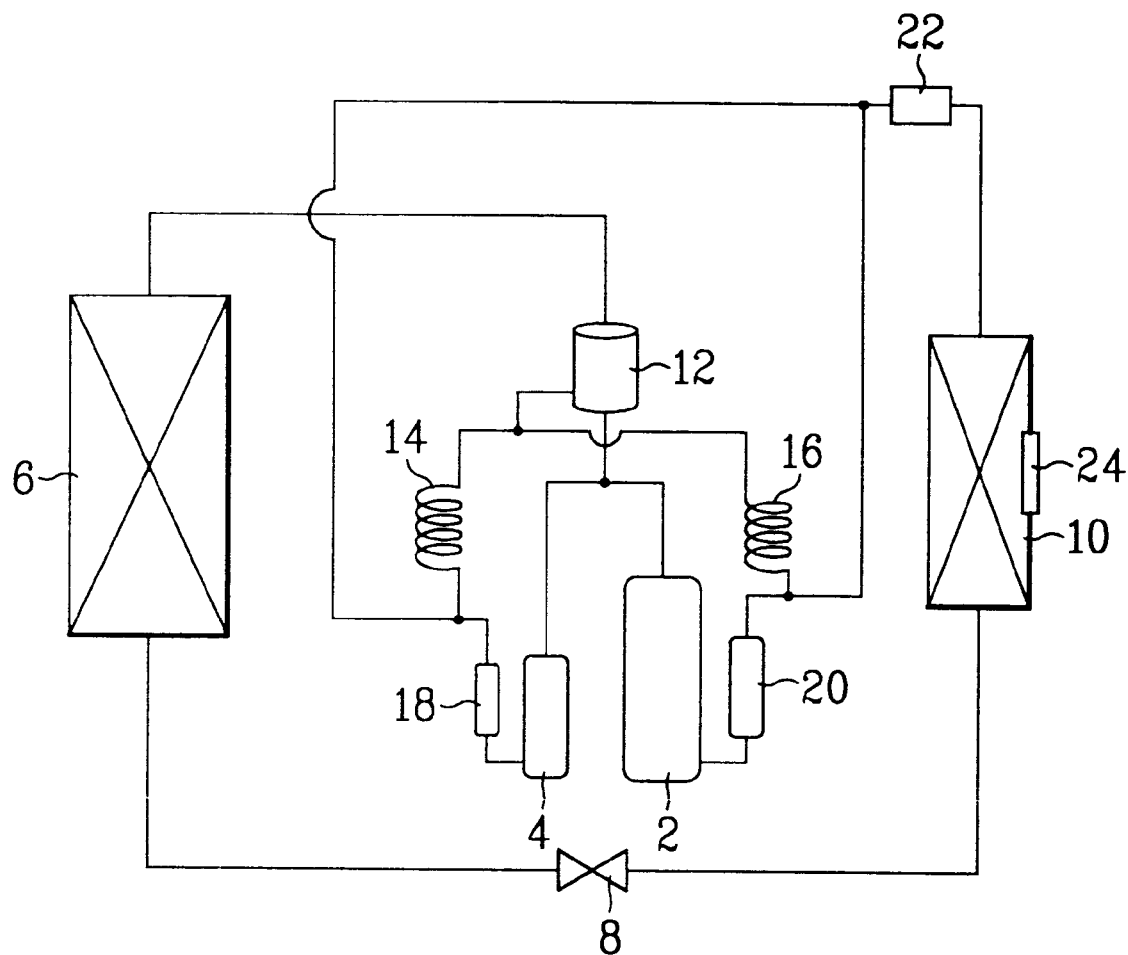
FIG. 1 illustrates a system of a related art air conditioner with two compressors, schematically.
Figure 2:
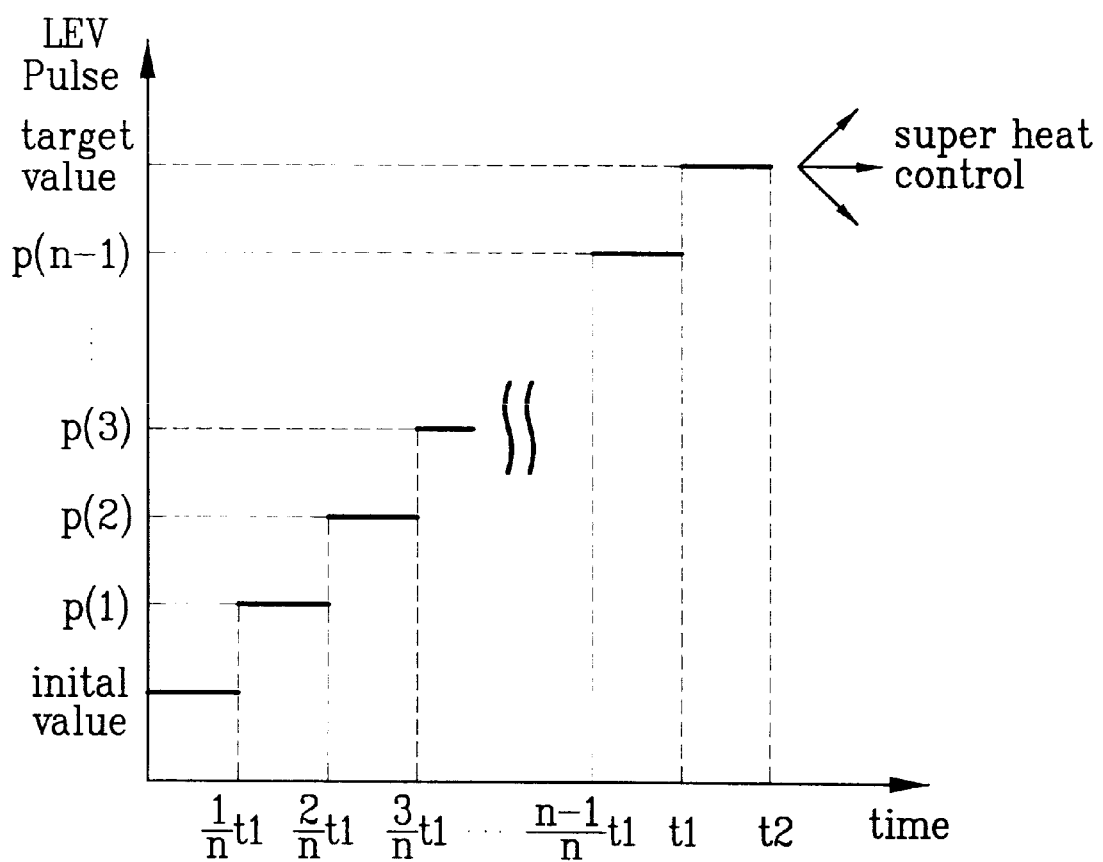
FIG. 2 illustrates a graph showing an LEV opening pulse value vs. compressor starting time period of a related art LEV controlling method for an air conditioner with two compressors.
Figure 3:
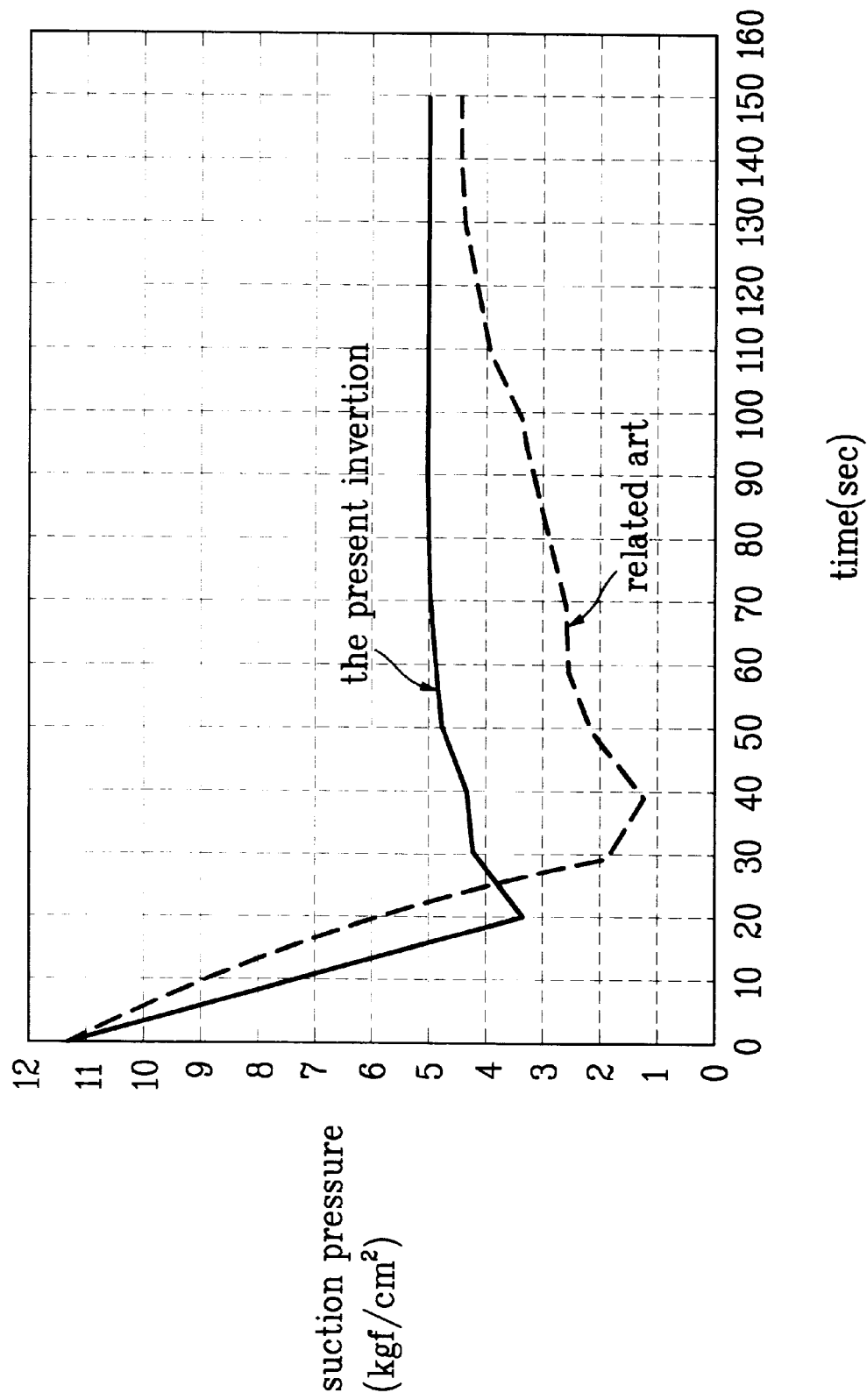
FIG. 3 illustrates a graph for comparing suction pressure vs. operation time period of a related art LEV controlling method, and an LEV controlling method of the present invention; and, FIG. 4 illustrates a graph showing an LEV opening pulse value vs. compressor starting time period in an LEV controlling method for an air conditioner with two compressors in accordance with a preferred embodiment of the present invention.

As has been explained, the method for controlling a linear expansion valve in an air conditioner with two compressors of the present invention requires only two steps of pulse changes during the pulse reaches from the initial value to the target value by controlling the LEV by using compressor capacity ratios. Variation of compressor suction pressure vs. time in an air conditioner system controlled according to the method of the present invention is illustrated in a solid line in FIG. 3. It can be known from FIG. 3 that the method of the present invention shows a smaller initial suction pressure drop than the related art, to permit the suction pressure to reach to a proper suction pressure faster than the related art after the compressors are started.

Thus, the method for controlling a linear expansion valve in an air conditioner with two compressors of the present invention can prevent drop of the suction pressure, and reduction of cooling performance during starting because opening of an LEV is varied from an initial value to a target value according to an operation time period of the compressors with reference to capacity ratios of the small compressor, and the large compressor.

Moreover, as the system can reach to a stable state within a short period after the starting, a system efficiency can be enhanced.

It will be apparent to those skilled in the art that various modifications and variations can be made in the method for controlling a linear expansion valve in an air conditioner with two compressors of the present invention without departing from the spirit or scope of the invention. Thus, it is intended that the present invention cover the modifications and variations of this invention provided they come within the scope of the appended claims and their equivalents.

What is claimed is:

1. A method for controlling a linear expansion valve in an air conditioning system with two compressors of a large compressor and a small compressor, comprising the steps of:

(a) changing an LEV pulse value from an initial value to P1, when a compressor operation time period reaches to Ts-a after the compressors are put into operation;

(b) changing the LEV pulse value from P1 to P2, when the compressor operation time period reaches to Tm-b;

(c) changing the LEV pulse value from P2 to a target value, when the compressor operation time period reaches to T1-c; and, (d) starting a superheat control, after the operation time period of the compressors reaches to T2, where P1 denotes an initial pulse value+ a capacity ratio (%) of the small compressor x the target value/100, denotes an initial pulse value+ a capacity ratio (%) of the large compressor x the target value/100, T1 denotes a time period to reach to the target value, T2 denotes a time starting to control superheat, Ts denotes a capacity ratio (%) of the small compressor x T1/100, Tm denotes a capacity ratio (%) of the large compressor x T1/100, 'a' denotes a time period the LEV pulse is changed from the initial value to P1, 'b' denotes a time period the LEV pulse is changed from P1 to P2, and 'c' denotes a time period the LEV pulse is changed from P2 to the target value.

2. A method as claimed in claim 1, wherein, when the LEV pulse value is changed from the initial value to P1, the capacity ratio of the large compressor is used.

3. A method as claimed in claim 1, wherein, when the LEV pulse value is changed from P1 to P2, the capacity ratio of the small compressor is used.

* * * * *